United States Patent [19]

Fredrickson et al.

[11] 3,872,460

[45] Mar. 18, 1975

[54] VIDEO LAYOUT SYSTEM

[75] Inventors: Walter G. Fredrickson, Indialantic; Albert W. Heitmann, Melbourne; Howard A. Thraikill, Indialantic, all of Fla.

[73] Assignee: Harris-Intertype Corporation, Cleveland, Ohio

[22] Filed: Apr. 13, 1973

[21] Appl. No.: 350,707

[52] U.S. Cl. .............. 340/324 AD, 178/17.5, 354/6

[51] Int. Cl. .............................................. G06f 3/14

[58] Field of Search ...... 340/324 A, 324 AD, 172.5, 340/336; 178/17.5, DIG. 6; 95/4.5; 354/6, 12, 13

[56] References Cited

UNITED STATES PATENTS

| | | | |
|---|---|---|---|
| 3,453,384 | 7/1969 | Donner et al. | 340/324 AD |
| 3,466,645 | 9/1969 | Granberg et al. | 340/324 A |
| 3,505,665 | 4/1970 | Lasoff et al. | 340/324 AD |
| 3,599,178 | 8/1971 | Jackson et al. | 340/324 AD |
| 3,709,525 | 1/1973 | Frank | 340/336 |

*Primary Examiner*—John W. Caldwell
*Assistant Examiner*—Marshall M. Curtis

[57] ABSTRACT

A video display system is disclosed for use in fitting advertising copy or other text matter in a desired final layout prior to typesetting. The original text is read into a video display terminal from a tape reader, for display on a CRT screen. Changes in the size, location and other parameters of the displayed text are made by typing characters and instructions from a keyboard and control panel at the terminal. The layout instructions and text data are encoded in digital format, modified by computer processing programs in accordance with the layout instructions, and the modified data drives character generating and position logic units for displaying the updated layout on the screen. The layout instructions, in the form of parameter messages, are displayed in an area or field adjacent to the text on the screen. Changes in any portion of the text are initiated by directing a test cursor or a parameter cursor to the appropriate element of text or the associated parameter message to be changed in the display, followed by keyboarding or keying in the desired changes. Following copy layout, the text and associated layout instructions are processed by the system into a format suitable for directly driving a photocomposing machine, and outputted to paper tape, magnetic tape or an electrical connection to a computer system.

11 Claims, 5 Drawing Figures

VIDEO LAYOUT SYSTEM

BACKGROUND OF THE INVENTION

1. Field

The present invention is in the field of video layout systems, and is specifically directed toward a system for fitting and correcting copy on a video display prior to typesetting.

2. Prior Art

Heretofore, ad copy has been processed to produce a finished ad layout which is to appear in print by a series of time-consuming and costly steps in the photocomposition flow. Typically, the printed ad copy in its original rough form as received from the art department of the newspaper or the customer is initially marked up in accordance with the desired layout. The marked up layout is then keyboarded into a computer typesetter. The proofs obtained from the typesetter are pasted up in accordance with the desired layout, and the paste-ups subjected to proofreading. Any errors or changes to be made in the paste-up copy are corrected or inserted by another keyboarding operation followed once again by the typesetting, paste-up and proofreading operations, leading to the composition of the final finished ad.

SUMMARY OF THE INVENTION

The present invention provides a video layout system which permits the accurate, rapid preparation for photocomposition of retail and classified display ads, complex straight matter, page composition, area composition and yellow page ads, and is compatible with a broad range of photocomposition and typesetting equipment. The system eliminates the previously required mark up and paste-up of ad elements while reducing the amount of keyboarding relative to that required in heretofore conventional photocomposition.

In the present invention, copy scanned or keyed into tape is read into a display terminal and is displayed as text on a video screen for layout. Using a keyboard-directed cursor and copyfitting keys, the text is positioned and displayed in actual point size and set width for any desired type font on the screen to match the precise layout desired for the final ad. Layout instructions and text data are processed by a computer in a terminal controlled unit. Copyfitting, movement of copy blocks, corrections, and changes in point size, film advance or leading, line measure, indent, skew and other typographical functions are immediately displayed in the copy on the screen together with parameter messages constituting layout instructions associated with line blocks of text in the displayed copy. When the operator determines that the displayed copy matches the desired layout he may instruct a tape punch to perforate a paper tape with all text and layout function codes required to drive the typesetting equipment.

DETAILED DESCRIPTION

The video layout system described herein is particularly useful in cold type ad production systems for ad copy inputting, fitting and correction prior to photocomposition. That is, the system is intended for use in display ad pre-composition with specific application to preparation of retail display advertising matter, classified display advertising matter, and directory (e.g., "Yellow Pages") advertising matter, and to layout composition of pages and areas (i.e., partial page).

Figure 1:
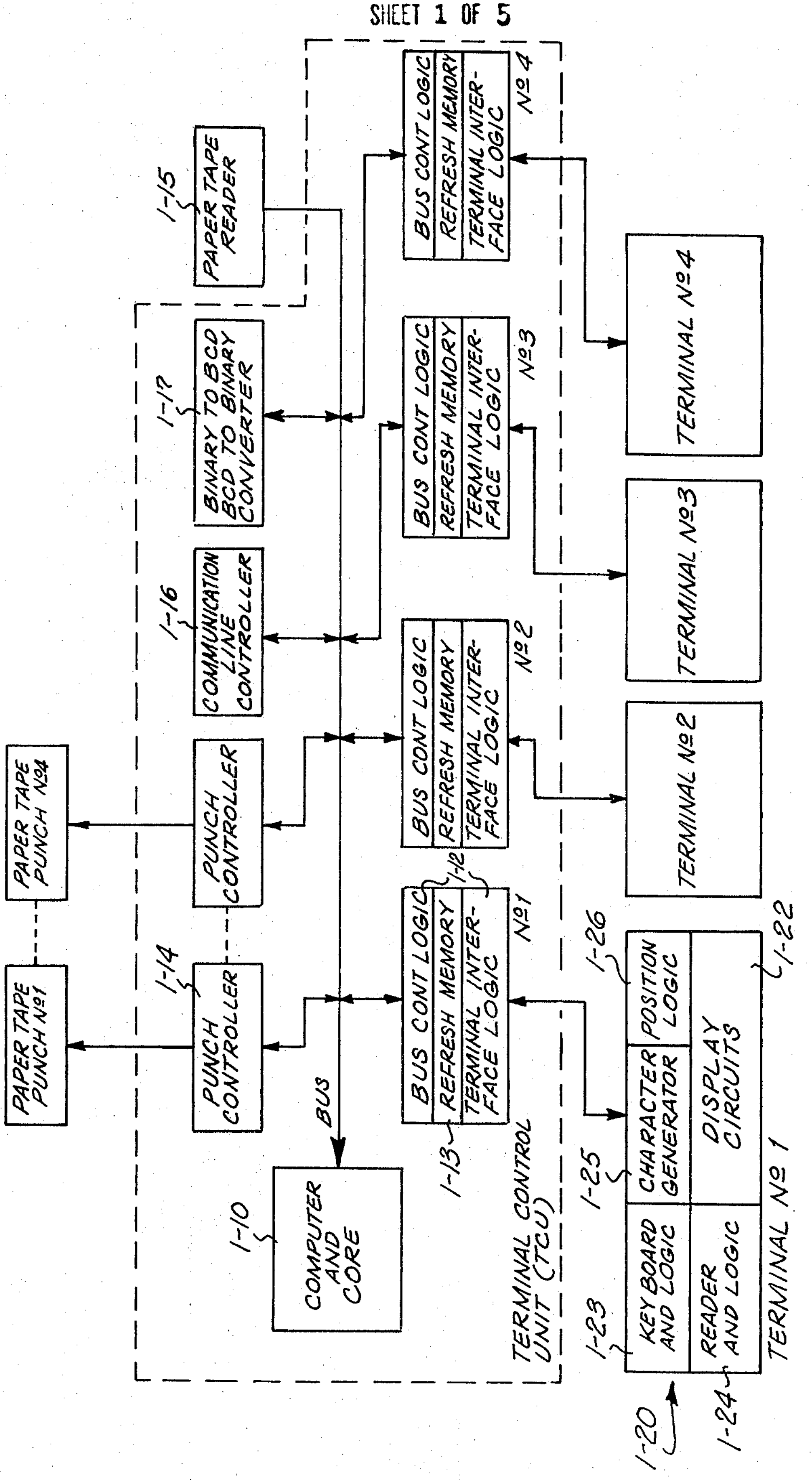
FIG. 1 is a block diagram of the overall video layout system.

The system consists of a terminal control unit (TCU) constituting a central station serving a plurality of remotely located editing and display terminals. As shown in FIG. 1, the TCU contains a general purpose computer 1-10 with core memory and processing programs, and control logic 1-12 to permit interaction between each terminal and the computer and peripheral equipment. Also included in the TCU are a refresh memory 1-13 for each console terminal, controllers 1-14 for paper tape punches, a paper tape reader 1-15, a communication line controller 1-16, and digital code conversion apparatus 1-17.

Each terminal 1-20 contains a cathode ray tube (CRT) with associated display circuits 1-22, a keyboard 1-23 with logic for entering the desired advertising text matter to be displayed on the CRT or for editing such data, a tape reader 1-24 with associated logic as an alternative means for entering data for display, a character generator 1-25 through which the keyboarded or tape input data is converted to characters to be displayed, and position logic 1-26 for positioning characters and blocks of characters on the CRT screen.

Figure 2:
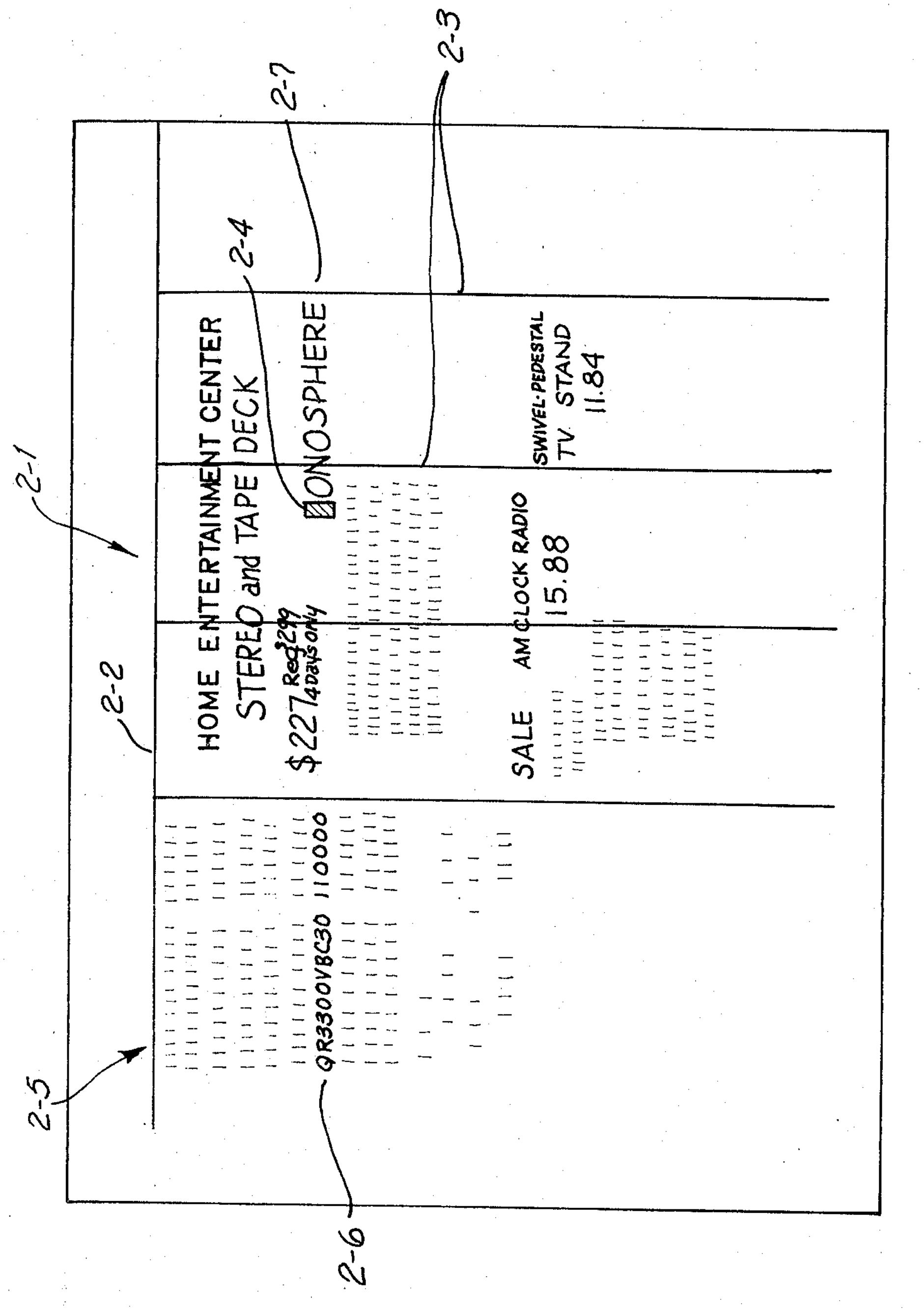
FIG. 2 illustrates a typical layout as seen by the operator on the video display screen of the terminal.

A typical video (CRT) screen display of ad copy and associated messages pertaining to the copy is shown in FIG. 2. The text display area 2-1 contains boundary rules 2-2 and variable column rules 2-3 which are displayed for convenience in copy fitting. The overall text display viewing area in a presently preferred embodiment of the console is 45 picas wide (equivalent to four standard newspaper column widths) by 7.5 inches deep. As will be described presently, a vertical scrolling feature permits the display of full newspaper column depths. Up to 1,000 characters of from 6 to 48 point true size may be displayed in the text viewing area, with proper spacing generated for larger character sizes in the range from 54 to 96 point. A cursor 2-4 may be moved about the text viewing area to designate the location of a desired editing change in the text.

A parameter message display area 2-5 is provided to the left of text display area 2-1. Each parameter message constitutes a layout instruction for a line block of text in the ad copy. For example, the parameter message 2-6 associated with the line block 2-7 (in this case, the word IONOSPHERE) at which the text cursor 2-4 is located in the text display area, and which is automatically temporarily intensified on the video screen to assist in identification by the operator, contains a set of codes pertaining to the cursor-identified line block. In that set, the QR is a quadding code (Quad Right), the 33 is a line measure code, the VBC is a font code, the 30 is point size, the 11 refers to film advance code, and the remainder of the message is an indent code.

Figure 3:
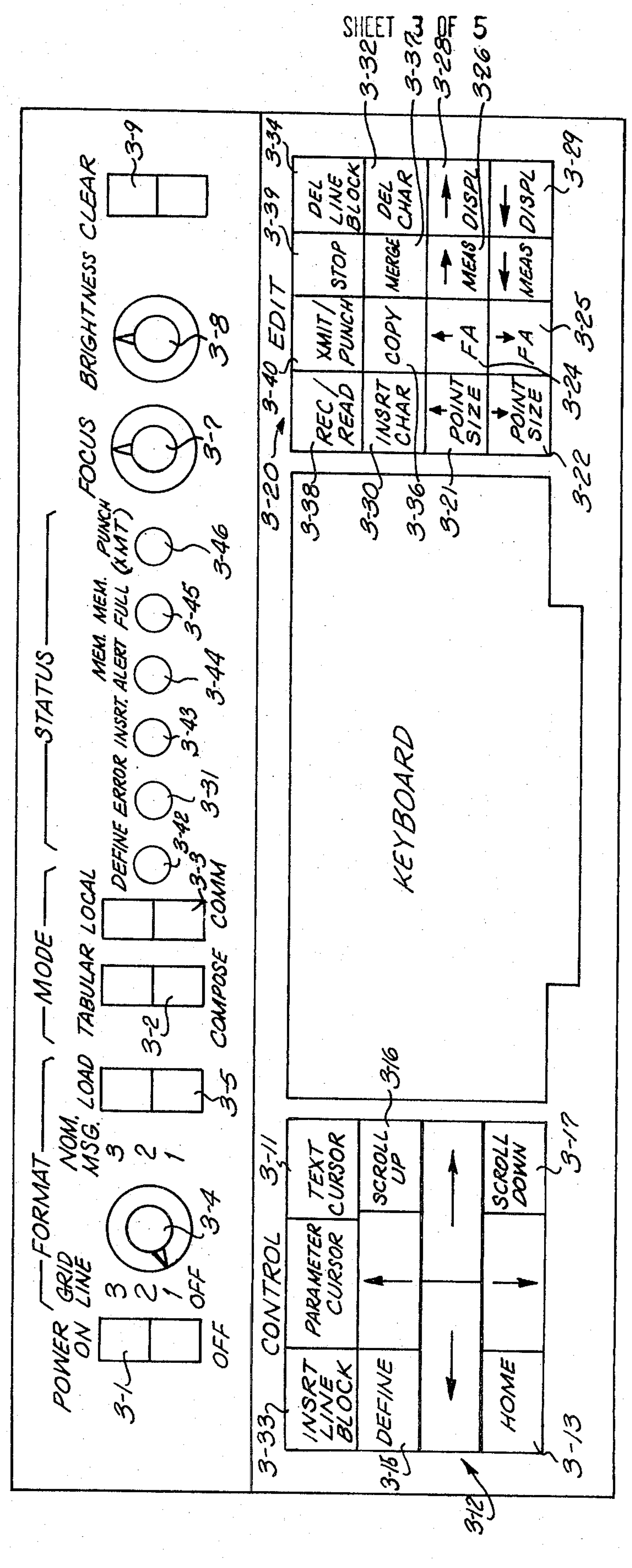
FIG. 3 is a front view of the keyboard and control panel of the terminal.

A typical control panel positioned immediately below the video screen of a terminal is shown in FIG. 3. A power switch 3-1 is used to turn the console on and off independently of the TCU. Aside from the power switch and a keyboard, the control panel has a plurality of function keys annnd switches for manipulation of the data and for control of the console by the operator. An alternate action control switch 3-2 allows the operator to select the mode (COMPOSE or TABULAR) in which the data is to be displayed. In the COMPOSE mode the advertising matter is displayed with all text located and sized in accordance with the operator's commands. Line lengths, ad depth, and character sizes are displayed full size on the CRT face for copy fitting and style. The parameter messages displayed in sequential rows in the area adjacent to the displayed advertising copy or text (see FIG. 2) appear in nominally 10 point characters with fixed spacing between message lines, and, with the associated text, constitute a line block. The COMPOSE mode permits the operator to display, lay out, and edit ads up to four columns wide and up to 7.5 inches deep at any given time. As will be described in greater detail presently, the operator may scroll the ad text vertically, upwardly or downwardly, on the CRT face to accommodate full column depth.

In the TABULAR mode, each parameter message is directly associated with and adjacent to the ad text to which it applies. The text and parameter messages are displayed in nominally 10 point characters, and since the parameter message and its associated text appear on the same line, the operator can rapidly determine the association between the two.

Another alternate action switch 3-3, labeled LOCAL/COMM, permits operator selection of the type of input (output), paper tape for LOCAL and on-line communication with the computer for COMM.

In the selection of formats, the operator has available a rotary switch 3-4 labeled GRID LINE/NOM MSG to select any of three stored grid line patterns for display on the CRT screen or any of three nominal or home parameter messages for use with raw copy inputs. A momentary action LOAD switch 3-5 allows the selected grid line pattern or nominal parameter message to be loaded into memory for use on the next ad.

Continuously variable FOCUS and BRIGHTNESS knobs 3-7 and 3-8, respectively, permit focusing of the characters and variation of intensity of the characters, respectively, displayed on the CRT screen.

A momentary action CLEAR switch 3-9 blanks the entire screen of all displayed information, and clears associated terminal storage without destroying the contents of the memory.

A set of control keys to the left of the keyboard as shown in FIG. 3 permit the operator to select and position the cursors associated with parameter messages and text. The text cursor, when selected, appears as a brightened character in the text displayed on the screen, at the ad copy line associated with the parameter message previously selected by the parameter cursor. A reversal of this operation occurs when the operator switches from the text cursor to the parameter cursor. In either event, only one cursor appears on the display at any given time. By depressing the PARAMETER CURSOR or TEXT CURSOR key (3-10, 3-11) the operator selects the cursor which is to undergo subsequent movement. UP, DOWN, RIGHT and LEFT keys 3-12 (labeled with appropriate directional arrows) are of the momentary action with repeat type. Upon selection of any one of these cursor positioning keys, the parameter or text cursor (depending upon which has been selected) is moved either incrementally (by momentary depression) or in a slewing mode (by continuous depression). The parameter cursor moves in increments of one line or one character, and the text cursor moves in increments of one line block or one character, being confined to the four column ad display area. A momentary action HOME key 3-13 returns the selected cursor to the home position, which, for the parameter cursor is the upper left hand corner of the CRT screen in the parameter message area, and for the text cursor is the upper left hand corner of the four column ad area.

A momentary action DEFINE key 3-15 is used to identify a line of the display on which some action is to be performed, such as insertion, movement, or copying. The defined line is accentuated by underline and overline dashes. The operator may also select multiple lines by defining the first and last of such lines.

SCROLL UP and SCROLL DOWN keys 3-16, 3-17, of the momentary action with repeat type permit the operator to move all of the displayed information upwardly or downwardly, respectively, on the CRT screen in line block increments. As data disappears at the top (or bottom) of the screen new data appears at the bottom (or top) of the screen. By continuously depressing the key the operator can cause a slewing action with ad copy and parameter message movement through the full column depth.

To the right of the keyboard in FIG. 2, the operator has available a set of edit keys 3-20 which permit the manipulation of text and parameter messages for copy fitting and editing. POINT SIZE keys 3-21, 3-22, of the momentary action with repeat type allow the operator to increase (upward arrow) or decrease (downward arrow) the point size of the ad copy (text) in increments compatiable with the typesetting machine, such as 12, 14, 18, and so forth. The line of text to undergo the point size change is selected by either the text cursor, or the parameter cursor. In this manner the operator can modify the original point size for a line of ad copy or can visually select the proper point size for typesetting. The parameter message lines, however, remain of the nominally 10 point character size. As any ad copy line undergoes change in point size the associated portion of the parameter message changes to indicate the new point size. Thus, the operator could, rather than selecting a line of copy and depressing the appropriate POINT SIZE key, simply define the appropriate portion of the parameter message and type in (by overstriking) the new point size desired which would result in the associated ad copy line automatically assuming that point size.

Film advance (FA) keys 3-24, 3-25. also of the momentary action with repeat type, permit modification of the vertical placement of the line blocks of text selected by either the text cursor or parameter cursor. For each key activation, the film is modified by one point, or the operator may depress the key for more than one second to cause automatic incrementing (decrementing) at a rate of two points per second, for the line block defined by the text cursor. Alternatively, the film advance may be changed by positioning the parameter cursor to the film advance field of the parameter message and overstriking the current film advance value with the desired new value. If it is desired to change the film advance within a line block, the operator may select the INSERT CHARACTER mode, to be described presently, and then depress the appropriate FA key. As the film advance for a line block is increased (or decreased), all remaining line blocks are displaced by the value of the added (or reduced) film advance.

A pair of momentary action with repeat keys 3-26, 3.27, labeled MEAS are provided to permit modification of the line measure of the line block defined by either the text cursor or the parameter cursor. Line measure is increased by depressing the MEAS key 3-26 bearing the arrow directed to the right and is decreased by depressing the MEAS key 3-27 bearing the arrow directed to the left. Each momentary depression of the key increases (or decreases) the line measure by one point. Depressing the key for more than one second increases (or decreases) the line measure automatically at a rate of 12 points per second. These keys are also used for changing the right indent of an indent typesetting command.

Another pair of momentary action with repeat keys 3-28, 3-29, labeled DISPL, are provided to permit modification of the horizontal displacement of line blocks defined by either the text cursor or the parameter cursor. Momentary depression of the key moves the selected line block one point to the right (or to the left) along the horizontal axis. Activation of a key for longer than one second produces automatic horizontal displacement of the selected line block in the selected direction at the rate of 12 points per second. These keys are also used for changing the left indent of an indent typesetting command, and setting of tabulation stops.

An INSRT CHAR key 3-30 of the momentary action type permits the operator to select a mode in which a character or a sequence of characters may be inserted at the position in a line block defined by the text cursor, by typing in the desired character(s) from the keyboard. Each character so typed is inserted at the location of the cursor, which thereupon undergoes an incremental displacement to the right together with all the remaining text of the line block. The cursor remains at the immediate right of the last character inserted. If the line block is justified, it becomes rejustified upon moving the cursor after insertion of the new character(s). Each line block is limited to a maximum number of characters; if this number is exceeded further inputs from the keyboard (or tape) are inhibited and an ERROR indicator lamp 3-31 is energized on the status indicator of the control panel. If desired, embedded film advance and/or point size changes may be inserted within the text area by depressing the appropriate FA and/or POINT SIZE keys while in the insert character mode. This mode is otherwise maintained until the cursor is manually moved or another edit key or control key is selected, at which time the entire line block is reset.

A DEL CHAR key 3-32 of the momentary action type is used for deletion of a character at the position of the text cursor. When a character is deleted, the remaining characters of the line block move one character position to the left. The DEL CHAR key must be activated for each character deleted. At that time, the entire line block is reset, set widths are recalculated and compared to line lengths. The DEL CHAR key becomes inactive when all characters from the position of the text cursor to the end of the line block are deleted. If a line block has been defined, in the manner described earlier, such that a define flag is present, then positioning of the text cursor to the first character of the line block and activation of the DEL CHAR key deletes the define flag. A second activation is required to delete the character.

An INSRT LINE BLOCK key 3-33 permits insertion of a new line block at a selected location, with concomitant downward displacement of the succeeding line blocks on the CRT screen. Three modes are available for this function. In a first mode, the text cursor or parameter cursor is moved to a selected line block, and another line block is defined. With the INSRT LINE BLOCK key activated, the defined line block moves immediately below the cursored line block and the succeeding line blocks undergo vertical displacement, downwardly on the screen, one line block position. The cursor is then repositioned to the first character of the newly inserted line block and the define flag is cleared from that block (e.g., by striking the DEL CHAR key 3-32).

In a second mode for the INSRT LINE BLOCK function, the parameter cursor is positioned at a line block below which a new parameter message is to be inserted. When the INSRT LINE BLOCK key is activated all line blocks following the cursor-identified line block move downward and a nominal valued parameter message is inserted. The cursor is then moved to the first character position of the newly inserted line block and the keyboard is placed in the overstrike mode. If the parameter cursor is positioned to the last line block in memory, the new parameter message is merely added to the list of messages. If it is desired to insert a line block ahead of the first line block in the list, the parameter cursor is positioned to the operator tag data line block and the INSRT LINE BLOCK key is activated.

In a third mode for the INSRT LINE BLOCK function, a single line block may be broken into two line blocks. The text cursor is positioned at the character within a line block which is to be at the beginning of the new line block. All text to the left of the cursor remains with the first line block. The parameter message is copied and inserted in the message list immediately below the cursor position, after which the text covered by and to the right of the cursor moves into a second line block beneath the first block. Both line blocks are reset and/or are rejustified, set widths are calculated and compared to line lengths. The cursor is repositioned to the first character of the second line block annd the keyboard is placed in the overstrike mode.

A DEL LINE BLOCK key 3-34 allows deletion of an entire line block of text (including the associated parameter message) with a concomitant closing of the space left at the deletion point. This is accomplished by positioning the cursor (text or parameter) to any character of the line to be deleted and activating the DEL LINE BLOCK key. Upon deletion, the keyboard status is restored to the overstrike mode. If the deleted line block is the last line block in memory, the cursor returns to the home position.

A COPY key 3-36 is provided to permit the copying of one or more parameter messages from one displayed position into a cursor-identified line block. In either cursor mode, the cursor is positioned anywhere within the line block (parameter message or text) for the parameter message to be copied. Activation of the DEFINE key 3-15 defines the line block in the manner previously described. The cursor is then repositioned to the line block in which the previously defined parameter message(s) is to be copied. Activation of the COPY key causes the first parameter message to be copied in the new cursor-identified line block, and the keyboard is restored to the overstrike mode. The next defined parameter message (or the same if only one is defined) can be copied into multiple positions by moving the cursor to the next desired line block and re-activating the COPY key, for each line block which is to contain the same parameter message. Copying of a parameter message leaves the originally defined message undisturbed, and only the parameter message data from the line block is copied.

A MERGE key 3-37 allows the operator to consolidate (merge) text with separate parameter messages into a single line block. To that end, the line block which is to contain the merged text is cursor-identified and then defined by activation of the DEFINE key 3-15. The cursor is repositioned to the line block whose text is to be merged into the defined line block. Activation of the MERGE key causes the parameter message portion of the cursor-identified line block to be deleted and the text portion to be added to the defined line block. The space previously occupied by the line block whose text was merged is automatically closed up. If the total number of characters in the merged line block exceeds 1022, the surplus characters form a second line block with insertion of a second parameter message, and succeeding line blocks undergo downward displacement by the space of one line block. The entire merged message is reset, and the set width calculated and compared to line length. If the line length is exceeded, the displayed line block blinks on and off to inform the operator.

A REC/READ key 3-38 is provided to initiate a data input operation from either the terminal paper tape reader or an external source, depending upon the state of the LOCAL/COMM switch 3-2. When the latter is in the LOCAL mode, activation of the REC/READ key starts the local (terminal) paper tape reader. The data is read into the refresh memory for that console in the TCU, for temporary buffering and for subsequent transfer to the TCU computer in variable length blocks depending on total loop processing time. If the temporary buffer is filled to its capacity of 16 characters before transfer to the computer can be accommodated, the local tape reader is automatically halted until the buffer is serviced by the computer. The tape reader can be restarted, whether the stoppage occurred because the buffer capacity has been reached or because the CLEAR switch 3-9 or the STOP key 3-39 has been activated, by reactivating the REC/READ switch 3-38. Upon completion of the read operation, the keyboard is restored to the overstrike mode. All keyboard and function keys, except the CLEAR and STOP keys, are locked out while reading.

When the LOCAL/COMM switch is in the COMM mode, activation of the REC/READ key initiates a data transfer from the external source via a communication line to the terminal, where the data is routed to the TCU computer for formatting. In either mode as a complete line block is assembled by the TCU processor it is displayed on the video screen of the console.

A XMIT/PUNCH key 3-40 is provided to initiate the transfer of "defined" data from the terminal. With the LOCAL/COMM switch in the LOCAL mode, activation of the XMIT/PUNCH key causes data designated by define flags in the parameter message field, plus ad sequence and operator identification data, to be outputted from the terminal for punching on tape. The output data is temporarily stored in the TCU refresh memory until accepted in blocks by the TCU computer memory, after which the data blocks are transferred to the paper tape punch. When the LOCAL/COMM switch is in the COMM mode, the defined data is transferred to an external unit coupled to the communication line. Data transfer for punching is governed by the following rules: (1) If no define flags are set, the command generated upon activating the REC/READ key is ignored and the ERROR indicator is lighted; (2) if one define flag is set, all data from the beginning of that recirculating in the refresh memory to and including the defined line block is transferred for punching, and the PUNCH/XMIT indicator is lighted; (3) if two define flags are set, the memory contents from the first defined line block to and including the second defined line block are transferred for punching, and the PUNCH/XMIT indicator is lighted; (4) if more than two define flags are set, rule (3) is followed starting with the first defined line block.

The STOP key 3-39 is provided to permit stopping of the paper tape reader or the punch operation by the operator. Activation of the STOP key terminates the currently active read or punch mode and restores the keyboard to the overstrike mode.

Several status indicator lamps are provided in the control panel immediately above the keyboard. A DEFINE indicator lamp 3-42 is turned on by program control when a line block is defined on the video screen (and hence, is defined in the refresh memory). An INSERT lamp 3-43 is energized when the INSRT CHAR key is activated, and is extinguished when any other function key is activated.

MEMORY ALERT and MEMORY FULL indicator lamps 3-44, 3-45 are energized by program control when the refresh memory is filled to within a predetermined level below capacity and to capacity, respectively. When the refresh memory is filled to capacity, no further data is accepted from the keyboard or from the paper tape reader of the terminal. The COPY, INSERT LINE BLOCK, INSRT CHAR, MERGE, REC/READ, and POINT SIZE keys are thereafter inhibited until the MEMORY FULL indicator is reset.

A PUNCH (XMT) indicator 3-46 is energized by program control upon activation of the XMIT/PUNCH key 3-40, and remains energized until the punching operation is completed.

The ERROR indicator 3-31 is energized upon detection of an improper edit command or processing sequence by the computer processing programs.

The keyboard layout at each terminal is basically the standard typewriter keyboard layout, with the addition of such character and function keys as may be necessary or desirable to the editing of ad copy.

Figure 4:
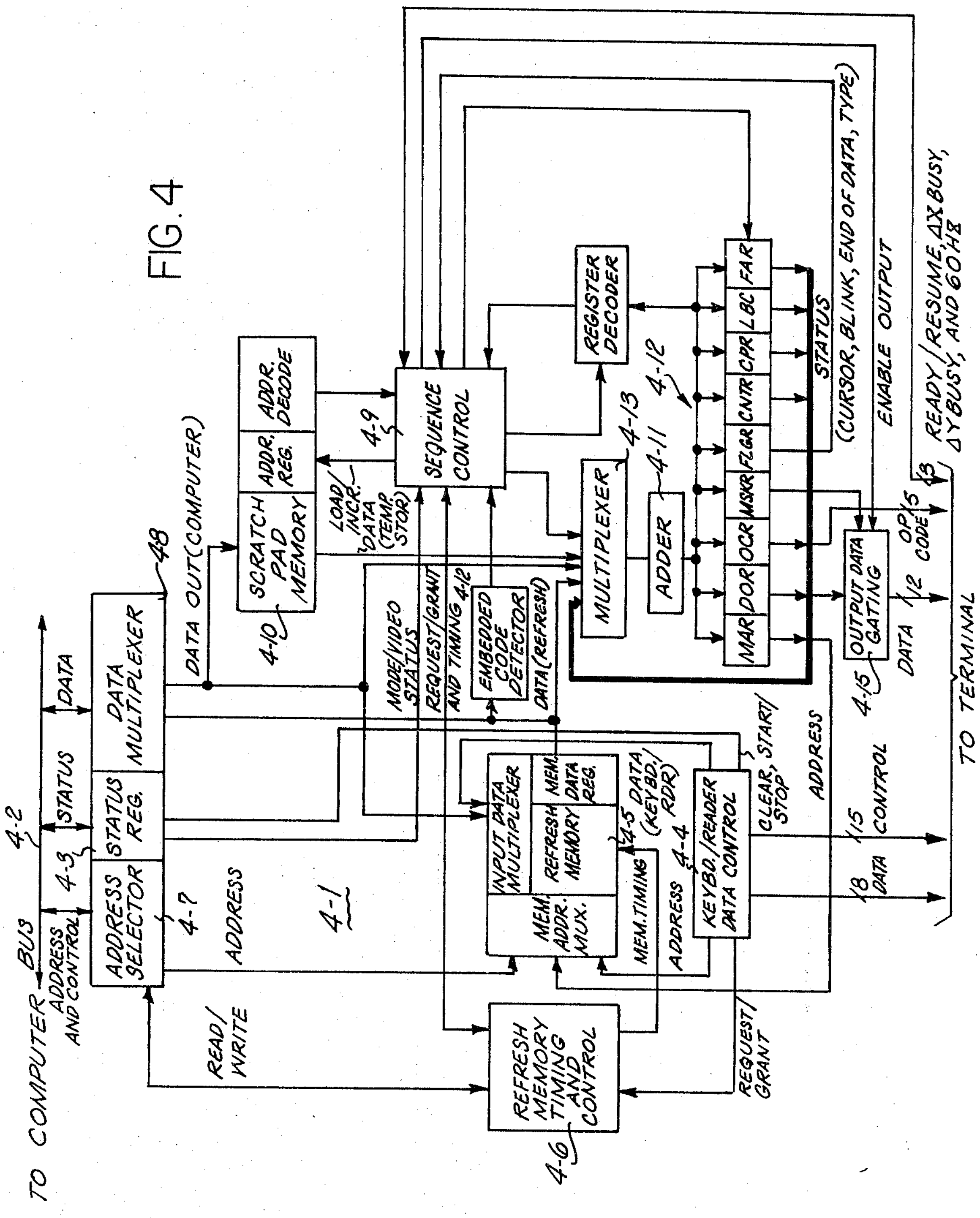
FIG. 4 is a block diagram of a portion of the terminal control unit.

Referring to FIG. 4, a single data and control apparatus section 4-1 in the TCU is shown for the sake of clarity and convenience, but it will be understood that corresponding apparatus is included within the TCU for each coupled terminal as was shown in FIG. 1. Data is entered into the data and control apparatus section from the keyboard, punched paper tape or through an external communications line. The data is displayed on the CRT of the terminal, modified as required, and punched out on paper tape or transferred on the communications line. TTS coded paper tapes are accommodated in the presently preferred embodiment. The modification and editing of data in the refresh memory of the TCU is accomplished by control logic in the section 4-1 in conjunction with software programs in the computer. Loading of the software programs into the computer is achieved at the programmer's panel of the computer from a paper tape using a tape reader in the TCU.

Because the data editing is accomplished through software programs and the data displayed is stored in the refresh memory, it is necessary to process data in the memory whenever modification of the data display is required. The necessary processing is effected by direct access of the computer to the refresh memory via a transfer bus. The terminal CRT is refreshed in synchronization with the 60 Hz line frequency.

When data displayed on a particular terminal CRT requires modification, the following basic operations are necessary. An active status is indicated by the terminal in response to data modification controls exercised by the terminal operator. The terminal indicating an active status is selected by the computer through its software program, and the computer processes and modifies the data in the refresh memory in accordance with the control and editing functions selected by the operator. During the processing and modification of data the terminal CRT is blanked.

The computer software program causes a sequencing of the apparatus in the TCU associated with each terminal as a query to determine whether a terminal is requesting service. If this query indicates that the terminal has an inactive status, the next terminal is immediately queried. This sequential scanning continues until a request for service is detected. The following relationships are required to be present: (1) Data processing is initiated with the terminal in an active condition. (2) The data is inputted to the TCU from the terminal tape reader or keyboard. (3) The punched tape data is transferred on a character basis from the computer under interrupt control. As data from the refresh memory is required for output to the tape punch, a service request for the selected terminal is generated by the computer program and the data is transferred to the computer in 32 word blocks.

Referring again to FIG. 4, all data, address and control information required to be transferred between section 4-1 in the TCU and the general purpose computer (for example, a PDP-11, Digital Equipment Corporation, Maynard, Massachusetts) is transferred by a single bus 4-2. The condition of an active terminal requiring service is indicated by coded information contained in a status register 4-3 which responds to outputs from a keyboard/tape reader data control unit 4-4 from data and control information supplied by the terminal. The terminal output data is temporarily stored in the random access refresh memory 4-5. The latter memory is under the control of a timing and logic control section 4-6 which, together with peripheral multiplexers and data registers, insures that data from the terminal and data modified by the computer is inserted in proper sequence in the refresh memory. Logic section 4-6 also controls the timing of an address selector 4-7, status register 4-3, data multiplexer 4-8 and a sequence control logic unit 4-9.

Output data from the computer is temporarily stored in a scratch pad memory 4-10 under the control of the sequence control logic unit 4-9. This data, together with that from the refresh memory, is multiplexed to an adder 4-11 for appropriately incrementing or decrementing a set of registers 4-12 associated with the control functions of the respective terminal.

The memory address multiplexer associated with refresh memory 4-5 is addressed by the contents of a memory address register (MAR) of set 4-12. Data in the form of a 12-bit code is outputted from a data output register (DOR) to the terminal via a gate 4-15. A 5-bit operation code from the op code register designates the desired one of a set of functions to be performed by the terminal equipment. Included in this set are instructions for blanking the CRT, writing a line block, updating the field, data entry, X and Y deviations, set width, point size, text and parameter cursor homing, X and Y deviation holds, set width hold, and point size hold. The 5-bit operation codes are supplied directly to the terminal. Output data from a mask register (MSKR) is inputted to the data channel via gate 4-15.

Status information regarding cursor, blinking, end of data, and type, contained in a flag register (FLGR), is furnished to sequence control logic 4-9. The contents of a counter register (CNTR), cursor position register (CPR), line block counter (LBC) and film advance register (FAR) are supplied together with outputs of the MAR, DOR, and OCR to the multiplexer via a bus 4-16.

The output data gate 4-15 is enabled by an instruction from sequence control logic 4-9. The latter unit also transmits and receives a 5-bit code designating ready/resume, ΔX busy, ΔY busy, and 60 Hz for video refresh.

Output data from the TCU is gated to the terminal together with operational codes to implement the functions selected by the terminal operator.

A special set of codes or flags may be inputted into the refresh memory in accordance with the text editing selected by the terminal operator. Five codes are utilized to handle the display of justified data, tabular data, mixed point sizes, fonts, and extra leading in a line block displayed on the CRT. A CL code is generated by the computer processing program from the input command sequences for justified text, skews and indents.

The CL code initiates a carriage return and a line feed function, as well as updating the indent field of the parameter message for the line block in which the cursor is active with an X-displacement value (INDENT) referenced to the left-hand column rule of the CRT. The indent field of the parameter message is not updated for skews; instead, a special parameter message format is used for displaying the depth and indent of the data. The CL code is 8 bytes in length, the first byte designating the code; the second and third bytes designating the indent in picas and points, respectively; thhe fourth and fifth bytes designating the line measure in picas and points, respectively; (sixth byte unused) and seventh and eighth bytes designating ±ΔX as an offset from the start of the previous line to the start of the current line.

A TB code is generated by the computer processing program in response to input command sequences for tabular data or to actuation of the INSERT TB key on the terminal. The code is used to initiate a tab function in the displayed text, and to update the indent field of the parameter message for the line block in which the cursor is active. As the input data fields are processed, they are matched to the tab stops (i.e., sets) which have been specified by the operator. The TB code along with its associated data, and a code displayed in the form of a special symbol which describes the positioning of the data in the defined tab field, are embedded in the text portion of the line block. The special symbols include Tab Left (TL), Tab Right (TR), Tab Center (TC), Split Quad (QM), and Justify Line ( → ). The TB code is 9 bytes in length, with bytes designating the code, indent, set width, $\pm\Delta X$, and the special symbol.

A PS code is generated by the computer processing program or is inserted from the terminal keyboard for variable point size data set on the same film advance. Upon generation or insertion, this code initiates a change in point size within the line block, and updates the point size field in the parameter message for the line block in which the cursor is active. Insertion of the code from the keyboard is implemented by selecting the INSRT CHAR mode and depressing the increase or decrease point size keys. Upon detection of each embedded PS code, the point size field in the parameter message is updated by the computer processing program as the cursor advances through the text of the line block. The PS code is eight bytes in length, with bytes designating the code, point size, set width, and $\pm\Delta Y$ vertical offset.

Embedded FA and FT codes are utilized to change the film advance and the font, respectively, within the line block. Each of these codes also initiates an update of the respective film advance field or the font field in the parameter message for the line block in which the cursor is active. Each is inserted in a similar manner to that described above for the PS code. In the 8 byte-length FA code, the bytes designate the code, film advance, and $\Delta Y$. The FT code is also 8 bytes in length, with bytes designating code, font, and set width.

In the TCU (FIG. 4), the presence of any of these embedded codes at the refresh memory output is detected by a detector 4-12 which supplies an enable signal to multiplexer 4-13 via sequence control logic unit 4-9.

Figure 5:
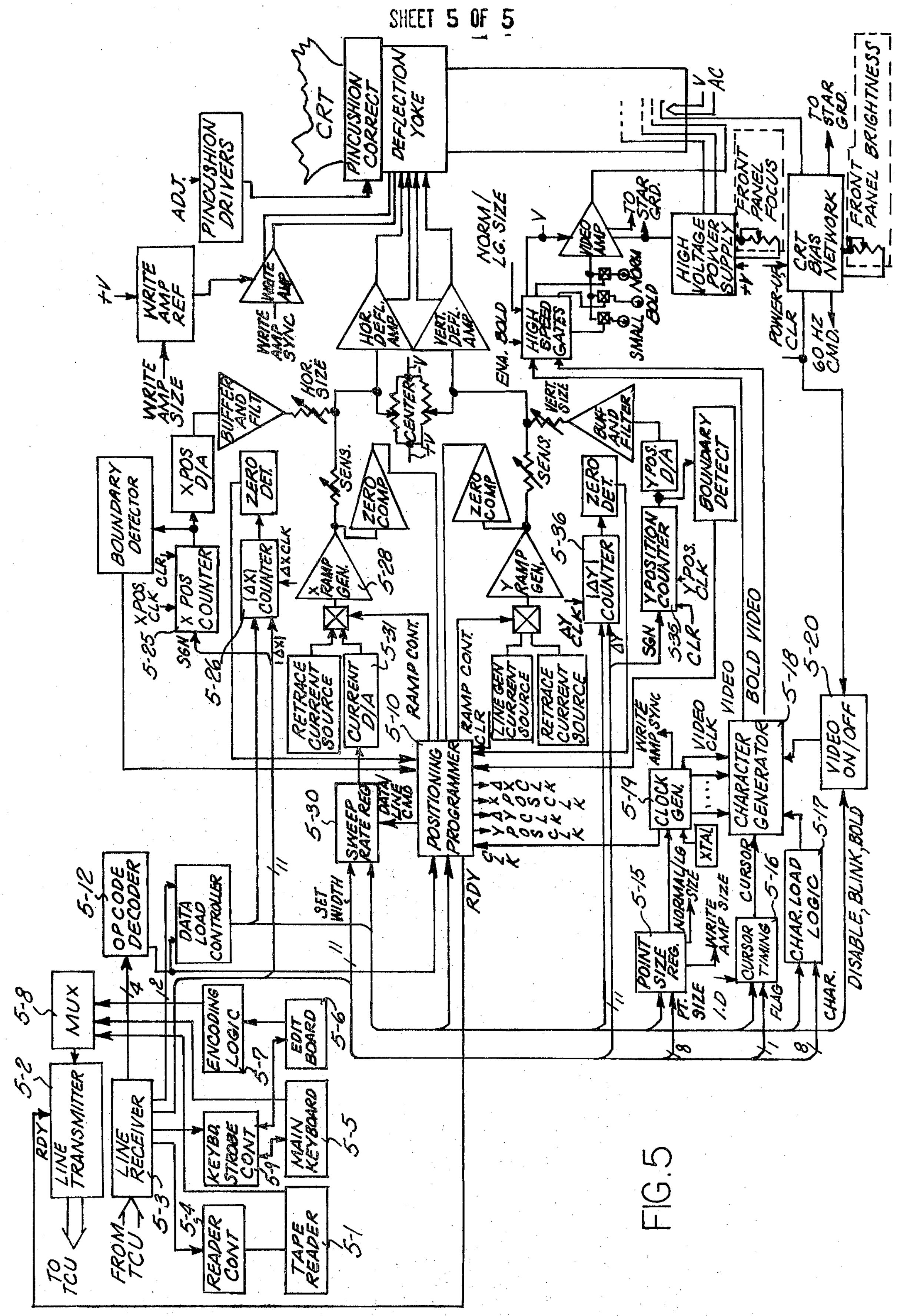
FIG. 5 is a block diagram of a terminal.

Referring to FIG. 5, the CRT and associated display circuits, the keyboard (and edit board) the tape reader, the character generator, and the position logic are shown in block diagrammatic form for a typical terminal. Punched paper tapes are read into the refresh memory in the TCU from the tape reader 5-1 via a line transmitter 5-2. The reader is controllable by instructions furnished by the terminal operator, or by commands from the TCU via a line receiver 5-3 and a reader control unit 5-4. The reader is preferably adapted to handle six, seven or eight-level tapes with in-line or advance sprocket holes, at 120 characters per second. Activation of the reader at the terminal is accomplished by placing the terminal in the LOCAL mode and activating the READ key. Characters from the reader are loaded into an input buffer of the refresh memory in the TCU for temporary storage until the computer is available to process the data. The input buffer stores up to 15 characters to allow approximately 125 milliseconds for processing data from the other terminals without degrading the input data rate of the reader. When the refresh memory is within 1,000 characters of being filled, that state is detected and the computer issues a command to stop the reader. A "memory alert" indicator at the terminal is energized to advise the terminal operator of this condition. The operator may also stop the reader at any time by depressing the STOP key. In either event the READ key must be reactivated to start the reader again. Data is loaded into the refresh memory starting with the last line block in the memory, and the data entry continues until the occurrence of a "memory alert" condition. There is no blanking of the CRT while data is being entered into the memory from the reader. However, during that time the terminal control panel (including keyboard and edit board) is inhibited except for the CLEAR and STOP functions.

Data generated in response to activation of keys on the keyboard 5-5 and edit board 5-6 is encoded by control logic 5-7 and supplied to the TCU via a multiplexer 5-8 and the line transmitter 5-2. Inhibiting of the control panel is accomplished by a keyboard control unit 5-9 in response to commands from the TCU via the line receiver. The line transmitter also transmits a "terminal ready" indication in response to a "ready" instruction supplied by a positioning programmer 5-10 in the position logic section of the terminal.

Processed data and timing information from the computer is supplied through the line receiver to the character generator and position logic sections of the terminal. The timing signals and operation codes, the latter through a code decoder 5-12, are furnished to units in the character generator and position logic sections to control the display of the data in the text and parameter messages of the line blocks with which the codes are associated.

In the character generator section, the data pertaining to point size is inputted to a point size register 5-15, the code data (including special symbols or flags) to a cursor timing unit 5-16, and the character data to character loading logic 5-17. The output data from these units is supplied to a character generator 5-18 controlled by timing signals from clock generator 5-19. In addition the character generator receives inputs from a video on/off unit 5-20 in response to operation codes providing DISABLE, BLINK and BOLD instructions from the data load controller. The outputs of the character generator 5-18 are gated to a video amplifier which drives the CRT.

In the position logic section of the terminal, the section functions are controlled by the positioning programmer 5-10 in conjunction with the processed data and operation codes. Horizontal positioning of data in the text and parameter messages in any given line block displayed on the CRT is handled by an X position counter 5-25. The counter is an accumulator whose digital outputs are subjected to a D/A conversion, and the analog information is buffered and filtered for input to a horizontal reflection amplifier which drives the deflection yoke of the CRT. Offset data is used in establishing the start of a new line of text relative to a previous line of text within a line block is handled by $\Delta X$ coder 5-26. The coder counts backward from the fixed count designating the previous line start. When the count reaches zero, a zero detector 5-27 supplies an input to positioning programmer 5-10 to control the X ramp generator 5-28. Set width data is also supplied to the X ramp generator via a sweep rate register 5-30 and a D/A converter 5-31. The output of the ramp generator is also supplied to the horizontal deflection amplifier to control the offset and set widths of the text being displayed. Vertical positioning of displayed line blocks is handled in substantially the same manner using process data and operation codes in a Y positioning section. The latter contains a Y position counter 5-35, a ΔY counter 5-36 and a Y ramp generator 5-37, together with associated units for supplying analog inputs to the vertical deflection amplifier 5-38 which also drives the deflection yoke of the CRT.

In use, the copy to undergo layout is scanned from previously punched tape or is punched on tape from the keyboard. The coded tape is read into the terminal from the local tape reader to provide a video display of the text on the CRT screen. The operator positions the copy on the display in the desired point size and set width for a selected type font by use of the keyboard-directed cursor and copy fitting control and editing keys. During the positioning of the copy, layout instructions are processed by the computer in the TCU in accordance with data entered into the refresh memory and processing programs in the computer. In the event that limitations of the typesetting equipment are exceeded by the copyfitting performed by the operator, the text appearing on the CRT screen is blinked at the point the error occurs.

The basic layout instruction selected by the operator for any given line of text is displayed on the left side of the screen in the form of a parameter message. If any portion or all of this layout instruction is changed, the displayed text adjusts accordingly to match the new instruction, through processing of the data and control information in the TCU.

A desired change in point size is achieved by positioning the text cursor on the element of text whose size is to be changed and depressing the POINT SIZE increase key. If the key is depressed momentarily and released, the element size increases to the next larger point size. Continued depression of the key causes the element size to step through successively larger point sizes until the desired size is achieved. Font or quadding changes are obtained by positioning the parameter cursor on the appropriate parameter message, which is thereby temporarily illuminated in bold face on the display to assist in identification by the operator. The font or quad code is thereafter overstruck from the keyboard with the desired code, and the corresponding text is immediately redisplayed with the new instruction. Other changes in displayed text to achieve desired copy fitting are accomplished in a similar manner.

All data pertaining to text and layout instructions is processed in the on-line TCU and updated information is provided by the TCU to the respective terminal to permit an instantaneous display of the layout changes.

When the final layout of the copy as desired by the operator is displayed on the screen, i.e., the ad copy text has been copy fitted, it is converted to typesetting codes compatible with the typesetting equipment to be driven. To that end, the parameter messages and corresponding text are punched out in line block format on an eight level paper tape, upon actuation of the XMIT/PUNCH key. Subsequent changes which may be desired in the ad copy layout are readily handled by redisplaying the copy from the punched tape and inserting the necessary layout instruction changes.

We claim:

1. In a video layout system for fitting prepared text in a desired layout for driving typesetting equipment, the combination comprising a terminal including means for reading stored text and layout instructions, a keyboard for selecting alphanumeric characters in the text to be displayed and for selecting layout instructions for the displayed text, video display means for displaying the text and layout instructions, character generating means responsive to read and keyboarded characters for driving said video display means, position logic means responsive to layout instructions that were read and to keyboarded layout instructions for controlling the positioning of the displayed text elements by said video display means, and means for encoding the read and keyboarded characters and layout instructions in digital data formats;

a terminal control unit including means for temporarily storing encoded data from said terminal, computer means responsive to the data stored in said storing means for processing said data in accordance with said layout instructions, means for transferring the processed data to said terminal for driving said character generating means and position logic means therewith to effect corresponding changes in the layout of the displayed text; and means for at will storing a coded format representative of the changed layout in the displayed text for driving the typesetting equipment.

2. The combination according to claim 1, further including means in said computer means for detecting and processing special instruction codes embedded in the temporarily stored encoded data.

3. The combination according to claim 1, further including additional terminals each including elements corresponding to the recited elements of the first-mentioned terminal, and means in said terminal control unit for indicating an active status of any terminal to gain access to said computer means by the respective active status-indicating terminal for processing the temporarily stored data thereof.

4. Apparatus for visual display and layout of classified advertising and display advertising copy on a video display screen preparatory to the typesetting of ads in printed media, comprising means for encoding stored information representative of the advertising copy in a digital data format, means for encoding instructions representing changes to be made in the encoded advertising copy in a digital data format, respecting size and relative locations of text elements in the copy, means responsive to the encoded instructions for modifying the encoded advertising copy in accordance with said instructions, means responsive to the modified encoded advertising copy for displaying the layout of said copy, including any changes therein, on said video display screen, means for at will selecting the location of an element of text in the displayed advertising copy at which a change is to be made, to encode an appropriate instruction relating to the display of that element, and means for storing at will the advertising copy in an encoded format representative of the displayed layout of the copy for use in driving typesetting equipment.

5. In a video layout system for fitting prepared text in a desired layout for driving phototypesetting equipment, said phototypesetting equipment requiring coded text commands for reproducing the text to be printed and coded phototypesetter commands for controlling the phototypesetter in accordance with parameters of the text to be printed, means for establishing said coded text and phototypesetter commands for a text to be printed, and means having a display surface and responsive to the established commands for displaying saaid text on a portion of said surface and for displaying said coded typesetter commands on said surface simultaneously with the text of the image to be printed, means for changing at will said coded text commands and said coded phototypesetter commands, and means for at will encoding the established coded commands for use in phototypesetting equipment.

6. In a video layout system for fitting prepared text in a desired layout for driving typesetting equipment, the combination comprising means for reading stored text and layout instructions, a keyboard for selecting alphanumeric characters to be displayed in the text and for selecting layout instructions for the displayed text, video display means for simultaneously displaying the text and layout instructions, character generating means responsive to characters that were read and to keyboarded characters for driving said video display means, position logic means responsive to layout instructions that were read and to keyboarded layout instructions for controlling the positioning of the displayed text elements by said video display means, means for encoding data in digital formats, said data comprising the characters and layout instructions that were read and keyboarded; means for temporarily storing encoded data received from said means for encoding, computer means responsive to the data stored in said storing means for processing said data in accordance with said layout instructions, means for applyng the processed data to drive said character generating means and position logic means to effect corresponding changes in the layout of the displayed text, means for changing at will the encoded data relating to text and layout instructions, and means for storing at will a coded format representative of the changed layout of the displayed text for driving the typesetting equipment.

7. The combination according to claim 6, and further including additional sets of the following ones of the elements recited therein: means for reading stored text and layout instructions, a keyboard for selecting alphanumeric characters to be displayed in the text and for selecting layout instructions for the displayed text, video display means for simultaneously displaying the text and layout instructions, character generating means responsive to characters that were read and to keyboarded characters for driving said video display means, position logic means responsive to layout instructions that were read and to keyboarded layout instructions for controlling the positioning of the displayed text elements by said video display means, means for encoding data in digital formats, said data comprising the characters and layout instructions that were read and keyboarded, and means for indicating an active status of any of said sets of elements to gain access to said computer means by a respective active status-indicating terminal for processing the temporarily stored data thereof.

8. In a video layout system for fitting prepared text in a desired layout for driving typesetting equipment and having a surface for displaying an image of said text approximately as it is to be printed, the combination comprising means for storing and establishing coded text commands for effecting operation of the phototypesetter to reproduce the text to be printed and coded phototypesetter commands for operation of the phototypesetter which specify to the phototypesetter at least one parameter for the text to be printed, means responsive to said coded text and phototypesetter commands for displaying said text corresponding to text commands on a portion of said surface and for displaying the phototypesetter commands simultaneously with the displaying of the text image, and means for changing at will said coded text commands and phototypesetter commands.

9. The combination according to claim 8 and wherein said means for displaying said phototypesetter commands comprises means for displaying each of said commands in a position on said surface that is aligned for visual association of the phototypesetter command with a respective portion of the display of the text image to which said command pertains.

10. The combination according to claim 8 and further comprising means responsive to said phototypesetter command-establishing means for modifying the display of the text image to conform approximately to said commands.

11. A video layout method for fitting prepared text in a desired layout for driving typesetting equipment comprising the steps of displaying an image of said text on a portion of a surfce, establishing at least one command that is not to be printed specifying a parameter of said text image, displaying said command on a second portion of said surface simultaneously with the displaying of said text image said text image conforming to said command, and changing at will said text and said command.

* * * * *

UNITED STATES PATENT OFFICE
CERTIFICATE OF CORRECTION

Patent No. 3,872,460 Dated March 18, 1975

Inventor(s) Walter G. Fredrickson; Albert W. Heitmann; and Howard A. Thraikill

It is certified that error appears in the above-identified patent and that said Letters Patent are hereby corrected as shown below:

Claim 11 should read as follows:

11. A video layout method for fitting prepared text in a desired layout for driving typesetting equipment comprising the steps of displaying an image of said text on a portion of a surface, in response to coded data representing the text, establishing coded data for at least one command that is not to be printed specifying a parameter of said text image, displaying said command in response to the coded data therefore on a second portion of said surface simultaneously with the displaying of said text image with said text image conforming to said command, and changing at will said coded data for said command to change at will said text and said command.

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*